Aug. 11, 1931.  F. W. HUBER  1,818,221
MEANS FOR MEASURING TEMPERATURE IN BOREHOLES
Filed May 1, 1929
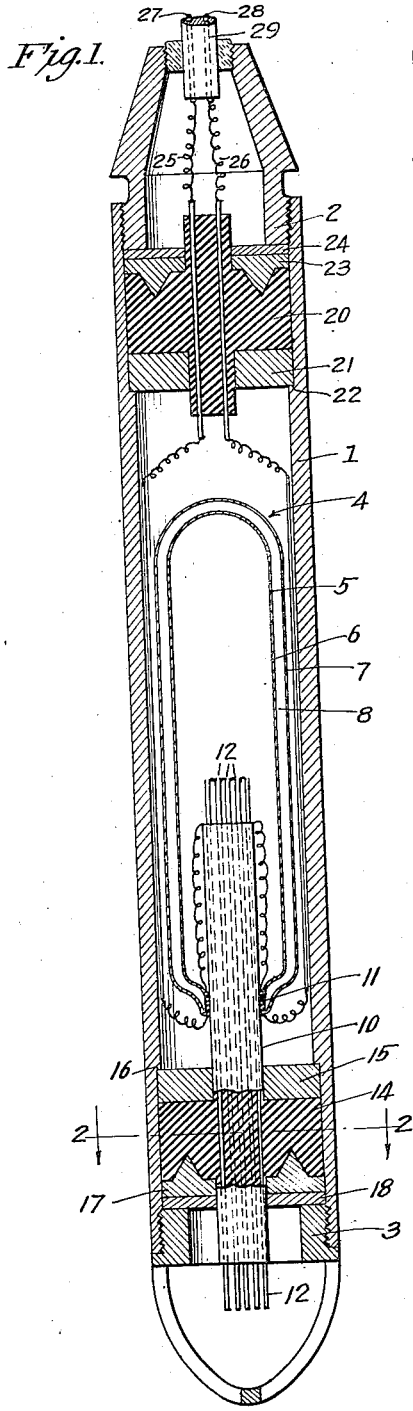
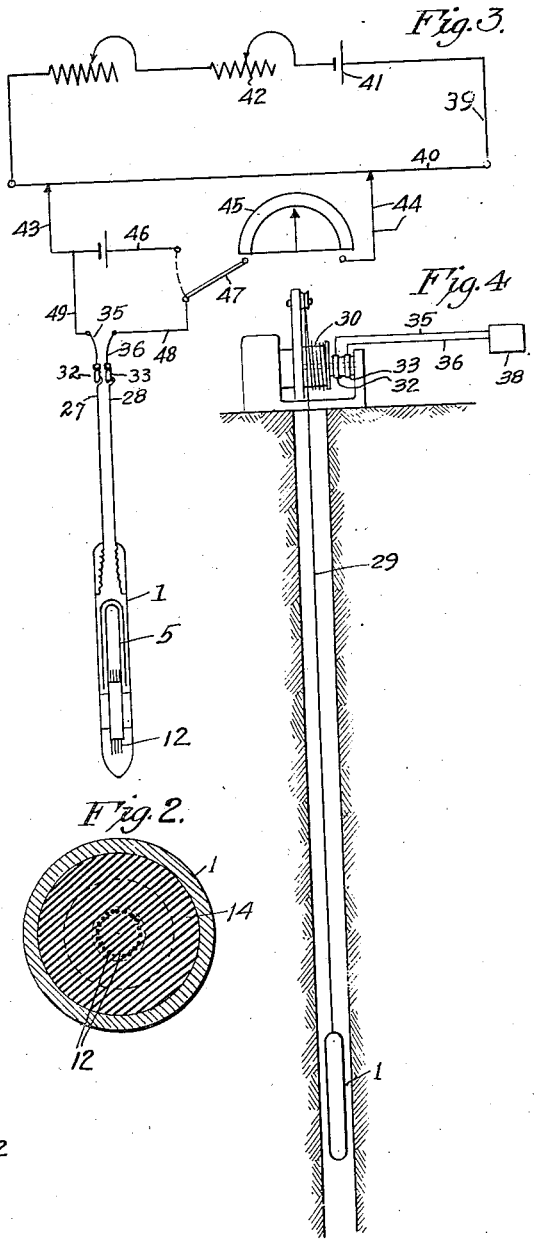
INVENTOR.
Frederick W. Huber,
BY Arthur P. Knight
Alfred W. Knight
ATTORNEYS Patented Aug. 11, 1931

1,818,221

UNITED STATES PATENT OFFICE

FREDERICK W. HUBER, OF RIVERSIDE, CALIFORNIA

MEANS FOR MEASURING TEMPERATURE IN BOREHOLES

Application filed May 1, 1929. Serial No. 359,584.

This invention relates to a means for measuring temperature and is particularly adapted and intended for measuring the temperature gradient in bore holes for oil wells and the like. It is, however, also adapted for measuring the temperature in various inaccessible locations, for example in deep sea sounding. My invention consists essentially in presenting at the place where the temperature measurement is to be taken, a body or mass adapted to retain a constant predetermined temperature for a sufficient time to enable the measurements to be taken and then measuring by thermo-electric operation, the difference in temperature between such constant temperature body and the zone or region at which the measurement is desired. The measurement being effected by electrical means, the actual reading of the measurement can be conveniently effected at any desired point.

Recently the geologist has come to look upon the temperature gradient in a bore hole as significant of structural peculiarities. Heretofore the measurement of such gradients has been a laborious and often uncertain task. In such measurements it has been found that the use of mercurial thermometers or other similar devices depending upon the expansion of a liquid from a bulb into a capillary is uncertain due to the effect of pressure upon the bulb. Again such devices are not readable at the surface but the thermometer (usually with a flat in the capillary) has to be withdrawn for each interval to obtain a reading. The indicating float is very easily dislodged by the vibration of the supporting wire or cable and this is a source of uncertainty. An important object of the present invention is to eliminate this source of error and to give a convenient means for reading the temperatures continuously at the ground surface.

The present invention depends upon the application of the thermo-electric current created by temperature upon two dissimilar metals in contact. The temperature to be determined is a function of electrical differences of potential and as such is capable of very exact measurement, the measurement of potential difference being one of the most accurate of all physical quantitative determinations and being independent of the varying temperatures of the lead cables and of the pressure under which the temperature is measured.

The accompanying drawings illustrate embodiments of my invention, and referring thereto:

Fig. 1 is a vertical section of the exploring device adapted to be lowered into the bore hole, and provided with means for containing a constant temperature body and a means for generating an electrical potential difference corresponding to the difference in temperature between said constant temperature body and the adjacent portions of the bore hole or the liquid contained in such bore hole.

Fig. 2 is a section on line 2—2 in Fig. 1.

Fig. 3 is a diagram showing the circuit connections.

Fig. 4 is a diagram showing the manner in which the exploring device is lowered into the well.

The device shown in Fig. 1 comprises a tubular casing 1 closed by screw heads or bushings 2 and 3 at the upper and lower ends thereof and formed integrally with a chamber 4, adapted to contain a receptacle 5 for the constant temperature body aforesaid. The constant temperature body indicated at 9 may consist of ice or other solid, adapted to melt at the temperature existing in the bore hole to be explored, and in order to retard the rate of melting as much as possible the receptacle 5 is thermally insulated, being, for example, formed as a Dewar flask or on the principle of the "thermos" bottle having inner and outer walls 6 and 7 with intervening "vacuum" space 8, one of the walls being preferably "silvered" in the usual manner to minimize radiation.

The receptacle 5 may be mounted in any suitable manner within the means 1 which serves as a container and protecting armor therefor. For example, the receptacle 5 may be supported by a stopper indicated at 10 mounted in the lower end of the tubular body 1 and extending up within the neck 11 of the receptacle 5 so as to form a tight joint therewith. The stopper 10 may be formed of soft vulcanized rubber and contains and supports the thermo-electric elements of the thermopile indicated at 12 which are molded into and extend through the stopper 10 and preferably project beyond the same at each end thereof, so as to provide for more effective heat transmitting contact for the functions of the thermo-electric elements. The stopper 10 is preferably molded or vulcanized in one piece with a larger stopper 14 which fits within the tubular body 1 and is clamped between a plate 15 engaging a shoulder 16 within the tubular body and a disc 17 which is pressed against the stopper 14 by means of the screw head or bushing 3 at the lower end of the tubular body 1. A plate 18 is shown between the screw ring 3 and the disc 17 to apply the pressure from the ring to said disc.

The construction shown in Fig. 1 provides a strong armor for the vacuum jacketed bottle or receptacle 5 which is necessarily of fragile construction. The "hot" junctions which are directly exposed to the fluid of the bore hole and also the cold junctions exposed to the melted ice are covered with a thin film of insulating varnish to prevent any short circuit between the couplets.

A stopper 20 is provided at the upper end of the tubular body 1, being mounted between upper screw member 2 and a plate 21 engaging a shoulder 22 within the tubular body, follower plates 23 and 24 being provided between the screw member 2 and the stopper 20. The stoppers 14 and 20 serve as packing gaskets to prevent entry of fluid to chamber 4 from the outside.

Lead wires indicated at 25 and 26 are connected to the opposite terminals of the thermo-electric means 12 and as the inner ends of the thermo-electric elements are exposed to the constant temperature body within the receptacle 5 and the outer ends of said thermo-electric elements are exposed to the liquid or fluid outside of the body 1 and adjacent thereof. There will be a potential difference developed between the wires 25 and 26 corresponding to the temperature difference between the liquid fluid aforesaid and the constant temperature body 9.

I prefer to use ice as the constant temperature body, on account of its high latent heat of fusion and its general availability. Any other substance may, however, be used, provided its fusing point is below the temperature to be measured, and is within the range of practical operation. For example, I may use hydrated calcium nitrate which melts in its water of crystallization at about 42° C.

The wires 25 and 26 are connected to the wires 27 and 28 of a cable by which the device is suspended and operated for raising and lowering the same, said cable being connected to any suitable operating means, for example a hoist or drum as indicated at 30 in Fig. 4, operated by suitable driving means and provided with means such as collector rings 32 and 33 for establishing connections between the respective wires 27 and 28 in the cable and stationary wires 35 and 36 leading to a suitable potential measuring means such, for example, as a potentiometer, indicated at 38.

Any suitable electrical measuring means may be used. I have indicated in Fig. 3 a potentiometer circuit suitable for the purpose, comprising a fine wire slide resistance 40 connected in a circuit branch 39 with a battery 41 and resistances 42, sliding contacts 43 and 44 in said slide resistances being connected in a circuit connection including the thermopile or thermo-couple means aforesaid and also including a sensitive galvanometer 45. A standard cell may be connected in a branch connection 46 adapted to be closed by a switch 47 for use in calibrating the instrument, said switch in normal position, closing connection from the galvanometer 45 to wire 48 leading to the cable wire 28, the other cable wire 27 being connected by wire 49 to the sliding contact 43 and the other sliding contact 44 being connected to the galvanometer 45. Using a potentiometer such as described, the potential difference developed at the thermo-electric means is measured directly and the measurement is not affected by the resistance of the cable conductors. The thermo-electric means 12 may be of any suitable type. I have used a set of ten couplets of copper and constantan in series.

I have found that the exposed thermocouple comes into thermal equilibrium with the fluid in the hole within a very few seconds. With an accurate potentiometer temperature differences of 1/50 degree C. are readily determined.

With the arrangement shown in the drawings I placed 50 grams of shaved ice into the flask surrounding the cold junctions. The temperature gradient was then determined on an oil bore 6100' in depth. The temperature at the warmest point being 95° C., it took about 1½ hours to make the complete run. After the run was completed the apparatus was withdrawn and the armor with couples, etc. submerged in water for an additional 5 hours, maintaining the temperature at about 95° C. The armor was then opened and the ice flask withdrawn. The temperature of the bath was found to still be zero and only about one third of the ice had melted.

As an example of the application of the invention to measure the temperature gradient of a bore hole: The cable on which the thermo-element with its ice bath and armor is fastened to the two conductor cable carried on a hoist. With the ice bath prepared and encased in its protective armor and all electrical connections made, the apparatus is lowered into the hole and the encountered E. M. F.'s measured on the potentiometer. The temperatures corresponding to these E. M. F. readings are then plotted against the depth at which they originated and the resulting curve on analysis gives the gradient. The only requirement is that the fluid in the well has stood long enough for the fluid to come into thermal equilibrium with the formation with which it is in contact.

I claim:

1. An apparatus for measuring temperature in bore holes, etc., comprising a casing and a receptacle therein for a body of material adapted to maintain constant temperature, thermo-electric means, having junctions in heat transmitting relation with the constant temperature body and junctions adapted to be brought into heat transmitting relation with the body whose temperature is to be measured, cable means for supporting and suspending said casing for bringing the thermo-electric means to the location at which the temperature measurement is to be taken, said cable including electric conductors connected to said thermo-electric means, and electrical measuring means connected to said cable conductors to measure the potential difference thereof.

2. Apparatus for measuring temperature in bore holes, etc., comprising a casing, a heat insulated receptacle therein containing a body of material whose fusion temperature is below the temperature to be measured, thermo-electric means mounted on said casing and having junctions in heat transmitting relation with said body of material and junctions exposed outside of the casing, and cable means connected to the casing and having conductors connected to said thermo-electric means.

3. A construction as set forth in claim 2, in which said receptacle is vacuum-insulated and said casing is provided with packing means to prevent excessive pressure on said receptacle.

In testimony whereof I have hereunto subscribed my name this 18th day of April, 1929.

FREDERICK W. HUBER.